No. 751,709. PATENTED FEB. 9, 1904.
H. ADAMS.
COFFEE POT.
APPLICATION FILED JUNE 29, 1903.
NO MODEL.
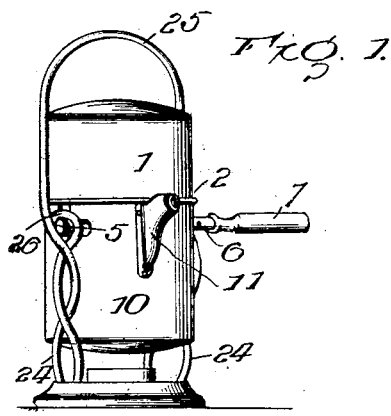
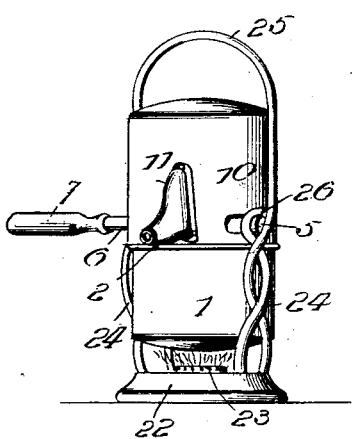
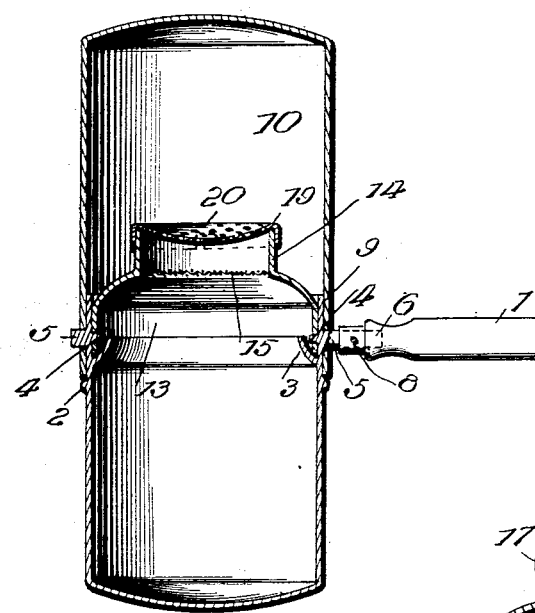
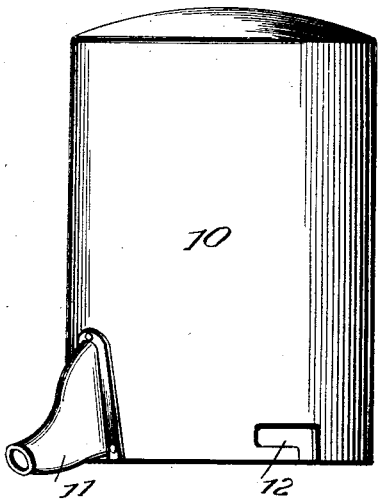
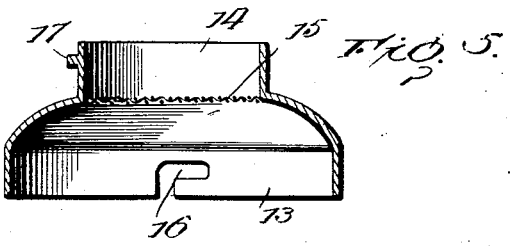
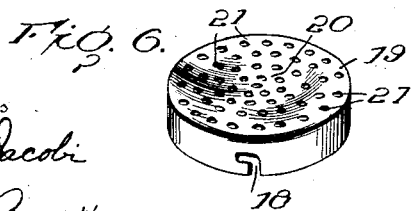
Inventor
Harry Adams
By E. H. Bond
Attorney
Witnesses
Wm. J. Jacobi
E. M. Brandt No. 751,709.                                    Patented February 9, 1904.

UNITED STATES PATENT OFFICE.

HARRY ADAMS, OF FOSTORIA, OHIO.

COFFEE-POT.

SPECIFICATION forming part of Letters Patent No. 751,709, dated February 9, 1904.

Application filed June 29, 1903. Serial No. 163,535. (No model.)

*To all whom it may concern:*

Be it known that I, HARRY ADAMS, a citizen of the United States of America, and a resident of Fostoria, in the county of Seneca and State of Ohio, have invented certain new and useful Improvements in Coffee-Pots, of which the following is a specification.

This invention relates to certain new and useful improvements in coffee-pots; and it has for its object, among others, to provide a simple and cheap efficient coffee-pot composed of two portions detachably connected and mounted in position upon a supporting-frame or the like and adapted to be inverted, so that the coffee may be placed in position within the coffee-pot and water poured thereon, and when the coffee is ready to serve the pot proper, which is hung in hangers or the like, is turned so as to reverse the position, when the water will again pass through the coffee into the compartment provided with the spout, from which it is poured.

The invention has for a further object to provide a coffee-pot of this character in which the parts can be readily separated for cleaning or other purposes and quickly assembled when desired.

Other objects and advantages of the invention will hereinafter appear, and the novel features thereof will be particularly pointed out in the appended claims.

The invention is clearly illustrated in the accompanying drawings, which, with the numerals of reference marked thereon, form a part of this specification, and in which—

Figure 1 is a perspective view of the coffee-pot shown in position for serving the coffee. Fig. 2 is a similar view showing the parts in the position they assume when ready to begin making coffee. Fig. 3 is an enlarged central vertical section through the coffee-pot. Fig. 4 is an enlarged perspective view of the section carrying the spout. Fig. 5 is an enlarged central vertical section through the top or cover. Fig. 6 is a perspective view of the reticulated cap removed.

Like numerals of reference indicate like parts throughout the several views.

Referring now to the details of the drawings, 1 designates the lower portion of the coffee-pot, having at a distance from its upper edge the outer annular bead 2 and upon its interior wall at a point in proximity to and above said bead the annular flange 3, which is tapered inwardly and upwardly, for a purpose soon to be explained. Upon the inner wall of the lower half 1, at a point above the junction of the flange 3 and the wall of said part 1, but at a point so as to be protected by said flange which forms a watershed, are the diametrically oppositely opposed inwardly-extending lugs 4, while extending outwardly in line with said lugs are the projections or trunnions 5, one of which is extended, as shown at 6, and serving as a stem upon which the handle 7 is engaged, said handle being held in place frictionally or by suitable means, as a pin or the like 8. (Shown in Fig. 3.) The wall of the lower portion 1 is extended above the lugs 4 to form an annular flange 9, as seen clearly in Fig. 3. 10 is the other half of the coffee-pot. It is provided near its open end with a spout 11, of any suitable form, and at the open end at the edge with the oppositely-disposed bayonet-slots 12, for a purpose soon to be described.

13 is the cover or coffee-holder having the contracted neck portion 14, at the base of which is the wire-gauze or equivalent diaphragm 15, as seen clearly in Figs. 3 and 5. The lower edge of this coffee-holder is provided with diametrically oppositely disposed bayonet-slots 16, as will be clearly understood from Fig. 5. Projecting from the neck portion 14 of this coffee-holder is a lug or pin 17, which is adapted to engage in the bayonet-slot 18 of the cap or cover 19, which is depressed, as seen at 20, and provided with a plurality of perforations 21.

22 is a base or support designed to support an alcohol-lamp or the like 23 and having rising therefrom the diametrically oppositely disposed uprights or supports 24, which may be as fanciful in design as desirable. They are extended to form a handle portion 25, by which the device may be carried from place to place, and intermediate the handle and base the standards or supports are provided with bearings 26, in which are rotatably supported the trunnions 5.

With the parts constructed and arranged substantially as above set forth the operation is as follows: Supposing the parts to be disassembled, the coffee-holder 13 is inserted within the compartment 1 by passing the same downwardly, so that the vertical portions of the slots 16 are coincident with the lugs 4, when by turning the one part with relation to the other so as to bring the lugs to the ends of the horizontal slots the holder will be firmly retained in place, the lower edge resting upon the watershed 13 and bearing against the inner wall of the compartment 1. It will be seen from Fig. 3 that the watershed extends over the joint between the coffee-holder and the inner wall of the compartment 1, so that as the parts are reversed the water is carried past the joint, and all possibility of leakage at the joint is prevented. The coffee-holder being in place the coffee is placed within the same, being supported upon the strainer or diaphragm 15, and the cap 19 is then placed in position, the vertical portion of its slot 18 being coincident with the lugs 17 on the holder, and the cap is then turned so as to bring the lug into horizontal portion of said slot. Boiling water is then poured in upon the coffee through the perforations in the cap 19, and then the upper half 10 is placed in position by bringing its slots 12 into alinement with the trunnions 5 and giving the part 10 a partial turn, so as to lock it in place. It is to be noted that the ends of the two parts extend past each other and past the dividing line, so as to make a tight joint. The coffee-pot being placed in position in the standards or hangers when it is desired to serve the coffee the pot is reversed by means of the handle, so as to bring the portion 10 lowermost, as seen in Fig. 1, and then the pot can be turned on its trunnions and the coffee poured from the spout. When thus inverted, the coffee in the compartment 1 flows through the strainer 15 and through the perforations in the cap 19 into the compartment 10, the curved or inclined watershed 3 serving to conduct the same past the lugs 4 and the joints between the parts, so as to avoid all possibility of leakage. The parts can be readily separated when desired for cleaning or other purposes.

The pot may in some cases be seated in a base-support over the lamp in and upon which the pot will rest instead of being supported by the trunnions and the uprights 24, in which case the pot would be lifted up by the handle to pour instead of turning in the trunnions.

What I claim as new is—

1. A coffee-pot of the class described comprising upper and lower sections with an inclined interior watershed at their junction and means for detachably connecting the same together, including trunnions on one of said sections and upon which the coffee-pot is rotatably mounted and inwardly-extending lugs and the other section provided with means coöperating with said lugs.

2. A coffee-pot of the class described comprising upper and lower sections, with an inclined interior watershed at their junction, means for detachably connecting the same together, including trunnions on one of said sections upon which the coffee-pot is rotatably mounted and inwardly-extending lugs, and the other section being provided with means coöperating with said lugs, and a detachable coffee-holder retained by said lugs.

3. A coffee-pot of the class described comprising upper and lower sections, means for detachably connecting the same together, including trunnions on one of said sections upon which the coffee-pot is rotatably mounted and inwardly-extending lugs, the other section provided with means coöperating with said lugs, a detachable coffee-holder retained by said lugs, and a depressed perforated cap for said coffee-holder.

4. In a device of the character described, a sectional coffee-pot with means for detachably uniting the sections, and a watershed projecting from the one section and beyond the end of the other section and protecting the joint between the sections.

5. In a device of the character described, a sectional coffee-pot the sections of which are adapted to be detachably united, an inclined watershed carried by the inner wall of one of said sections and extended beyond the joint between the sections, and a detachable coffee-holder within the sections having its joint protected by said watershed.

6. In a device of the character described, a sectional coffee-pot, the sections of which are adapted to be detachably united, an inclined watershed carried by the inner wall of one of said sections and extended beyond the joint between the sections, and a detachable coffee-holder within the sections having its joint protected by said watershed, one of said sections being provided with outwardly-projecting trunnions, one of which is extended to form an attachment for the handle.

7. In a device of the character described, a sectional coffee-pot with means for detachably uniting the sections, an inclined watershed carried by the inner wall of one of said sections and extended beyond the joint between the sections, and a detachable coffee-holder within the sections having its joint protected by said watershed, one of said sections being provided with outwardly-projecting trunnions, one of which is extended to form an attachment for the handle, combined with a base and vertical standards having a handle, and supports for said trunnions.

Signed by me at Fostoria, Seneca county, Ohio, this 8th day of May, 1903.

HARRY ADAMS.

Witnesses:
R. L. UNDERWOOD,
GEO. W. CUNNINGHAM.